United States Patent
Singh et al.

(10) Patent No.: US 11,640,701 B2
(45) Date of Patent: May 2, 2023

(54) PEOPLE DETECTION AND TRACKING WITH MULTIPLE FEATURES AUGMENTED WITH ORIENTATION AND SIZE BASED CLASSIFIERS

(71) Applicant: Analog Devices International Unlimited Company, Limerick (IE)

(72) Inventors: Raka Singh, Bangalore (IN); Anil M Sripadarao, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 81 days.

(21) Appl. No.: 17/092,863

(22) Filed: Nov. 9, 2020

(65) Prior Publication Data
US 2022/0036109 A1 Feb. 3, 2022

(30) Foreign Application Priority Data

Jul. 31, 2020 (IN) .............................. 202041032870

(51) Int. Cl.
*G06K 9/00* (2022.01)
*G06V 10/20* (2022.01)
(Continued)

(52) U.S. Cl.
CPC ......... *G06V 10/255* (2022.01); *G06K 9/6215* (2013.01); *G06K 9/6227* (2013.01);
(Continued)

(58) Field of Classification Search
CPC .. G06K 9/00; G06K 9/00503; G06K 9/00523; G06K 9/00536; G06K 9/62;
(Continued)

(56) References Cited

U.S. PATENT DOCUMENTS 6,263,088 B1 * 7/2001 Crabtree .................. G06T 7/11
382/104
7,876,361 B2 1/2011 Lin et al.
(Continued)

FOREIGN PATENT DOCUMENTS

EP 2973218 B1 6/2018

OTHER PUBLICATIONS

Meltem Demirkus, Ling Wang, Michael Eschey, Herbert Kaestle and Fabio Galasso, "People Detection in Fish-eye Top-Views", Proceedings of the 12th International Joint Conference on Computer Vision, Imaging and Computer Graphics Theory and Applications, 2017, pp. 141-148 (Year: 2017).*

(Continued)

*Primary Examiner* — Eric Rush
(74) *Attorney, Agent, or Firm* — Schwegman Lundberg & Woessner, P.A.

(57) ABSTRACT

This disclosure describes techniques to detect an object. The techniques include operations comprising: receiving an image captured by overhead camera; identifying a region of interest (ROI) of a plurality of regions within the image; selecting an object classifier from a plurality of object classifiers based on a position of the identified ROI relative to the overhead camera; and applying the selected object classifier to the identified ROI; and detecting presence of the object within the ROI in response to applying the selected object classifier to the identified ROI.

25 Claims, 5 Drawing Sheets

(51) Int. Cl.
| | |
|---|---|
| *G06T 7/70* | (2017.01) |
| *G06T 5/40* | (2006.01) |
| *G06K 9/62* | (2022.01) |
| *G06V 10/50* | (2022.01) |
| *G06V 40/10* | (2022.01) |
| *G06V 10/70* | (2022.01) |
| *G06V 10/22* | (2022.01) |
| *G06V 10/75* | (2022.01) |
| *G06V 20/52* | (2022.01) |
| *G06V 10/25* | (2022.01) |
| *G08B 13/196* | (2006.01) |
| *G06V 10/46* | (2022.01) |

(52) U.S. Cl.
CPC ............... *G06T 5/40* (2013.01); *G06T 7/70* (2017.01); *G06V 10/22* (2022.01); *G06V 10/25* (2022.01); *G06V 10/50* (2022.01); *G06V 10/75* (2022.01); *G06V 10/87* (2022.01); *G06V 20/52* (2022.01); *G06V 40/10* (2022.01); *G08B 13/19608* (2013.01); *G06V 10/467* (2022.01); *G06V 2201/07* (2022.01)

(58) Field of Classification Search
CPC .. G06K 9/6215; G06K 9/6217; G06K 9/6227; G06K 9/626; G06V 10/12; G06V 10/147; G06V 10/22; G06V 10/25; G06V 10/255; G06V 10/42; G06V 10/44; G06V 10/443; G06V 10/454; G06V 10/46; G06V 10/467; G06V 10/473; G06V 10/50; G06V 10/70; G06V 10/74; G06V 10/75; G06V 10/751; G06V 10/7515; G06V 10/759; G06V 10/768; G06V 10/811; G06V 10/87; G06V 10/92; G06V 20/52; G06V 20/53; G06V 20/54; G06V 20/58; G06V 20/593; G06V 40/00; G06V 40/10; G06V 40/103; G06V 40/16; G06V 40/161; G06V 40/20; G06V 2201/07; G06V 2201/08; G06T 5/40; G06T 7/11; G06T 7/70; G06T 7/73; G06T 7/74; G06T 7/75; G06T 2207/20004; G06T 2207/20012; G06T 2207/20021; G06T 2207/30196; G06T 2207/30201; G06T 2207/30232; G06T 2207/30236; G06T 2207/30242; G08B 13/19606; G08B 13/19608; G08B 13/19613; G08B 13/19628

USPC ....... 382/100, 103, 104, 106, 107, 115, 117, 382/118, 154, 155, 159, 160, 173, 181, 382/190, 195, 209, 216–218, 224, 226, 382/227, 282, 291; 348/77, 135, 143, 348/152, 155, 161, 169; 340/933, 935, 340/937; 706/20

See application file for complete search history.

(56) References Cited

U.S. PATENT DOCUMENTS

| | | | |
|---|---|---|---|
| 7,987,111 B1 | 7/2011 | Moon et al. | |
| 8,264,524 B1 | 9/2012 | Davey | |
| 8,284,258 B1 | 10/2012 | Cetin et al. | |
| 8,295,545 B2 | 10/2012 | Hampapur et al. | |
| 8,320,626 B2* | 11/2012 | Higuchi | G06V 20/58 382/104 |
| 8,692,867 B2 | 4/2014 | Bigioi et al. | |
| 9,418,278 B2* | 8/2016 | Adachi | G06V 40/10 |
| 9,569,695 B2* | 2/2017 | Pau | G06V 10/40 |
| 9,964,624 B2* | 5/2018 | Wilson | G06T 7/246 |
| 10,402,633 B2 | 9/2019 | Tang et al. | |
| 10,447,966 B2 | 10/2019 | Ritchey et al. | |
| 2010/0033579 A1* | 2/2010 | Yokohata | G06T 7/20 348/169 |
| 2010/0195899 A1* | 8/2010 | Nc | G06V 40/103 382/218 |
| 2010/0272363 A1* | 10/2010 | Steinberg | G06V 40/16 382/190 |
| 2012/0274782 A1* | 11/2012 | Kitaguchi | G06V 10/147 348/169 |
| 2014/0193034 A1* | 7/2014 | Oami | G06V 40/10 382/103 |
| 2015/0077568 A1* | 3/2015 | Tsunematsu | G06V 20/52 348/159 |
| 2015/0294483 A1 | 10/2015 | Wells et al. | |
| 2018/0012085 A1* | 1/2018 | Blayvas | G06T 7/70 |
| 2018/0047181 A1* | 2/2018 | Miyazaki | G06V 10/44 |
| 2019/0130215 A1 | 5/2019 | Kaestle et al. | |
| 2019/0306417 A1* | 10/2019 | Yaguchi | G06T 7/248 |
| 2022/0004749 A1* | 1/2022 | Tanaka | G06V 40/103 |

OTHER PUBLICATIONS

Tsaipei Wang, Yun-Yi Hsieh, Fong-Wen Wong, Yi-Fu Chen, "Mask-RCNN Based People Detection Using A Top-View Fisheye Camera", IEEE, 2019 International Conference on Technologies and Applications of Artificial Intelligence, Nov. 2019, pp. 1-4 (Year: 2019).*

Ahmad, Misbah, et al., "Person Detection from Overhead View: A Survey". International Journal of Advanced Computer Science and Applications, 10(4),, (2019), 567-577.

Wang, Tsaipei, et al., "Template-Based People Detection using a Single Downward-Viewing Fisheye Camera", International Symposium on Intelligent Signal Processing and Communication Systems, Xiamen, China, (2017), 719-723.

* cited by examiner

PEOPLE DETECTION AND TRACKING WITH MULTIPLE FEATURES AUGMENTED WITH ORIENTATION AND SIZE BASED CLASSIFIERS

CROSS-REFERENCE TO RELATED APPLICATION

This application claims the benefit of priority to Indian Application No. 202041032870, filed with the India (IN) Patent Office on Jul. 31, 2020, which is incorporated herein by reference in its entirety.

FIELD OF THE DISCLOSURE

This document pertains generally, but not by way of limitation, to detecting objects using overhead cameras, and more particularly, to using multiple classifiers to detect a person in an overhead camera.

BACKGROUND

People detection and counting in a room is an important task in many applications such as surveillance, building, and space management, etc. Normally, the sensor is installed at the center of the room, on the ceiling and looks downwards. This kind of installation limits the occlusion issues but introduces various other complications when attempting to detect people.

SUMMARY

Systems and methods are provided for detecting people with multiple classifiers. In some embodiments, a processor and memory are provided for performing operations comprising: receiving an image captured by an overhead camera; identifying a region of interest (ROI) of a plurality of regions within the image; selecting an object classifier from a plurality of object classifiers based on a position of the identified ROI relative to the overhead camera, a first of the plurality of object classifiers being configured to detect a first feature of the object, and a second of the plurality of object classifiers being configured to detect a second feature of the object; applying the selected object classifier to the identified ROI; and detecting presence of the object within the ROI in response to applying the selected object classifier to the identified ROI.

In some implementations, the operations include: associating a first region of the plurality of regions with a first subset of the object classifiers; and associating a second region of the plurality of regions with a second subset of the object classifiers.

In some implementations, the object classifiers are configured to detect human objects, wherein the first region corresponds to a first rotation relative to the overhead camera and is within a first distance relative to the overhead camera, and wherein the first subset of object classifiers comprises a head classifier. In some implementations, the second region corresponds to the first rotation relative to the overhead camera and is within a second distance relative to the overhead camera that is greater than the first distance, and wherein the second subset of object classifiers comprises a first head-shoulder classifier. In some implementations, a third region of the plurality of regions corresponds to a second rotation relative to the overhead camera and is within the second distance relative to the overhead camera, and wherein the third region is associated with a second head-shoulder classifier. In some implementations, a third region of the plurality of regions corresponds to the first rotation relative to the overhead camera and is within a third distance relative to the overhead camera that is greater than the second distance, and wherein the third region is associated with a first upper-body classifier.

In some implementations, a fourth region of the plurality of regions corresponds to the second rotation relative to the overhead camera and is within the third distance relative to the overhead camera, and wherein the fourth region is associated with a second upper-body classifier.

In some implementations, the operations further comprise: associating a first classifier type with a first region of the plurality of regions that is within a first distance of the overhead camera; associating a different ones of a second classifier type with each of a plurality of second regions of the plurality of regions that are within different respective rotations and at second distances relative to the overhead camera, each of the second distances being greater than the first distance; and associating a different ones of a third classifier type with each of a plurality of third regions of the plurality of regions that are within different respective rotations and at third distances relative to the overhead camera, each of the third distances being greater than the second distance. In some implementations, the first classifier type comprises a head classifier, the second classifier type comprises a head-shoulder classifier, and the third classifier type comprises an upper-body classifier.

In some implementations, the object comprises a vehicle or a human, and the operations further comprise: receiving data indicating a potential presence of the object within the ROI; and pre-processing the data to identify a plurality of features comprising at least one of motion, occlusion, a confidence map, foreground, background, or edges, wherein the ROI is identified based on the pre-processed data and one or more shape-based calibrated models.

In some implementations, the operations further comprise: selecting a feature type used by the selected object classifier based on the position of the identified ROI, the feature type being selected from the group consisting of Histogram of Gradients (HOG) only, Local Binary Pattern (LBP) only and HOG-LBP.

In some implementations, the operations further comprise adjusting stride based on the position of the identified ROI. In some implementations, the stride is of a first value in response to determining that the identified ROI is within a first distance of the overhead camera and is of a smaller second value in response to determining that the identified ROI is within a second distance of the overhead camera that is larger than the first distance.

In some implementations, the operations further comprise assigning a confidence metric to the object. In some implementations, the operations further comprise using the confidence metric to increase a count value representing number of people in an area or tracking the object.

In some implementations, the object is a human or a vehicle, and the overhead camera comprises a fisheye lens.

In some implementations, the operations further comprise: setting a pixel padding parameter for tracking the object across multiple video frames based on the position of the identified ROI and activity associated with the object.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
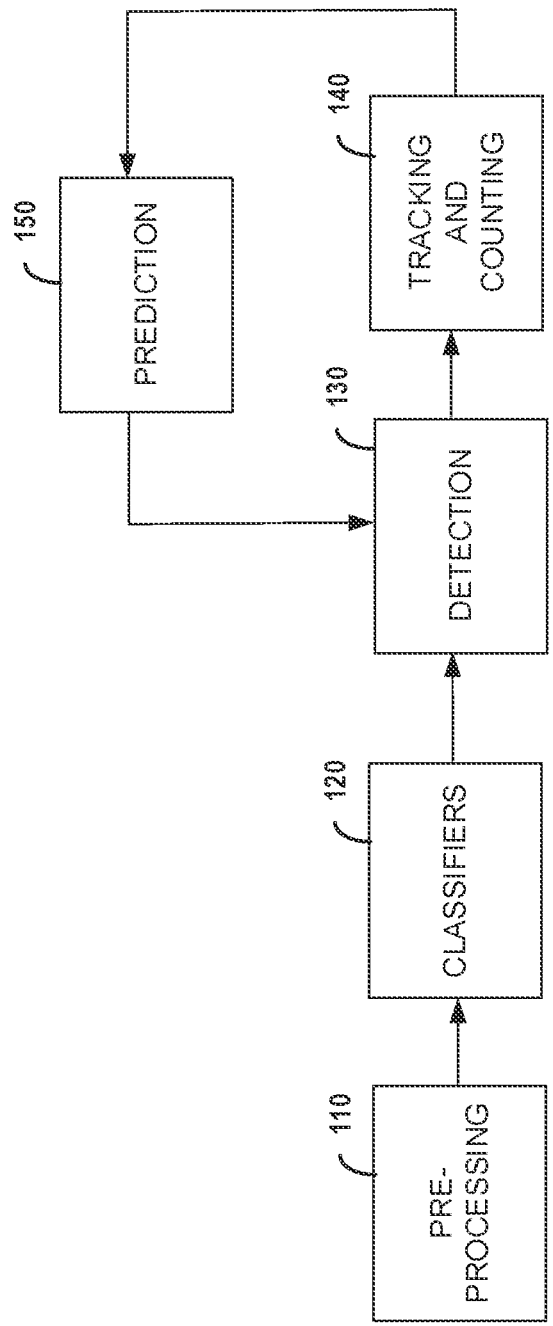
FIG. 1 is a block diagram of an example of an object detection system in accordance with various embodiments.

This disclosure describes, among other things, techniques to pre-process images to extract multiple features and to select one or more classifiers for detecting objects (such as humans) in images received from an overhead camera (such as a fisheye lens), and use post processing detection and tracking on the detected objects.

Typical systems utilize fisheye lenses to get an omni-view of the room for the purposes of tracking people and counting people. Such a setup though reduces the view of a person compared to an upright frontal/slanted camera installation. This makes typical people classifiers and tracking engines unreliable for detecting and counting people. Using fisheye lens further complicates the view as it introduces additional distortion effects on the captured image. For example, the view of a person from the fisheye captured image varies drastically based on the position of the person in the room. Namely, at the center, right below the camera, only the head of the person may be seen and as the person moves farther from the sensor other parts of the body start to appear.

Certain typical vision algorithms use classifiers to detect the people candidates and use this information to track and count the people. State Vector Machine (SVM) classifiers using Histogram of Gradients (HOG) features may be suitable for detecting people in general but rely on multiple features of the people to be present in the captured images. Thus, such typical algorithms are orientation and rotation dependent which limits their application. To apply such typical algorithms to images captured using fisheye lenses, transforms (rotation and scaling) can be applied to the captured images prior to applying the typical classifiers. The transforms, though, depend on the position of the person to accurately be used by the classifiers. Also, the transforms use a great deal of memory and computation resources which makes them inefficient for application on embedded processors which are resource constrained.

According to the disclosed embodiments, the disclosure describes a novel and resource efficient approach to use multiple classifiers to detect people in a room based on their position in a region-of-interest (ROI) captured in an overhead camera that may use a fisheye lens. The disclosed approach selects between multiple classifiers which are orientation (also referred to as rotation) and size aware to detect and track objects, such as people. The disclosed approach selects only a subset of classifiers from a large pool of classifiers based on where the person is sitting, e.g., orientation or rotation of the person and distance of the person from the position of the camera. By selecting the type of classifier to use based on the position of the ROI, the disclosed embodiments can efficiently detect and track people in a room. Multiple classifiers can be stored each associated with a different position and orientation of objects in a room and the classifier. These multiple classifiers can be pre-configured and associated with the different position and orientation of objects and are trained to detect objects as they appear to the overhead camera from the different positions and orientations. Utilizing multiple classifiers can avoid the need to apply transforms to captured images and improves the tracking and detecting of objects in a room. In this way, the amount of resources used to detect and track objects in a room are reduced and the disclosed approach can be applied on embedded resource constrained processors.

In some cases, the size of the classifier can also be chosen based on the position of the person. In some cases, the stride for a sliding window detection can be dynamically adjusted based on the position of the person. In some embodiments, the pool of classifiers is built to cover all orientations and postures and sizes in a given room type, such as a conference room. The classifiers can also use different features for training. In one approach, the selected classifiers are run around the tracked objects to assign confidence measure to the tracked object.

In some embodiments, multiple features of an image received from the overhead camera, such as edge, foreground pixels, motion pixels are processed using two pre-processing engines. The outputs from the pre-processing engines are used as augmentation to tracking and machine learning classification blocks. The outputs from these detection blocks are used in post-processing blocks to further enhance the accuracy of people detection using people calibrated models. Finally, the location of detected people are provided in a feedback loop into the tracking and association and classification block to enhance the detection.

FIG. 1 is a block diagram of an example of an object detection system 100 in accordance with various embodiments. The object detection system 100 includes a pre-processing block 110, one or more classifiers 120, a detection block 130, a tracking and counting block 140, and a prediction block 150.

The object detection system 100 may count the number of people and their locations from a centrally mounted ceiling overhead sensor (e.g., a fisheye lens camera or other suitable camera). In some cases, the object detection system 100 is configured to count and track human people as objects. In some other cases, the object detection system 100 is configured to count and track vehicles as objects. In such cases, the object detection system 100 (or certain components of the system 100, such as the cameras or sensors) may be mounted overhead on a street sign above one or more car lanes. While the disclosed system is discussed with respect to tracking and counting human objects, the disclosed system can be applied to count and track any other type of object (cars, boats, planes, animals, and so forth).

Images captured by overhead cameras (that may or may not use fisheye lenses) are free from occlusion but may sometimes exclude key features such as face, foot, hands of objects etc. which adversely impacts object detection. Also, relying only on motion features of the objects for detection and counting may not be reliable due to noise/light changes that may be interpreted as motion and incorrectly included in the counting/tracking. Also, multiple people in close proximity may not be detected separately and detecting and tracking people who make little motion may also be challenging.

The object detection system 100 receives at the pre-processing block 110 one or more images from an overhead sensor or camera, such as a fisheye lens. The one or more images may include multiple features, such as foreground, edges, motion, and occlusion features. The pre-processing block 110 extracts the features from the images. A first pre-processing engine in the pre-processing block 110 extracts motion features and occlusion features from the images. Occlusion features are defined as pixel-level features where occluding foreground pixels are extracted. A second pre-processing engine in the pre-processing block 110 extracts foreground pixels using a Mixture of Gaussian (MOG) algorithm and augments the foreground pixels with edge foreground pixels.

For example, the first pre-processing engine computes a motion map from consecutive frames received from the overhead sensor and generates a contrast change map to identify the areas of positive contrast change and negative contrast changes. The first pre-processing engine may use a passive infrared sensor (PIR) signal during changing lights to figure out the actual motion. The first pre-processing engine computes the occlusion map (or people in foreground) based on these contrast changes and forms occlusion (foreground) entities by segmenting the occlusion map. With the help of motion map segmentation along with the occlusion entities, occupancy count entities are formed. These entities represent potential people or objects. The life of these occupancy count entities depends on motion in subsequent frames.

Figure 2:
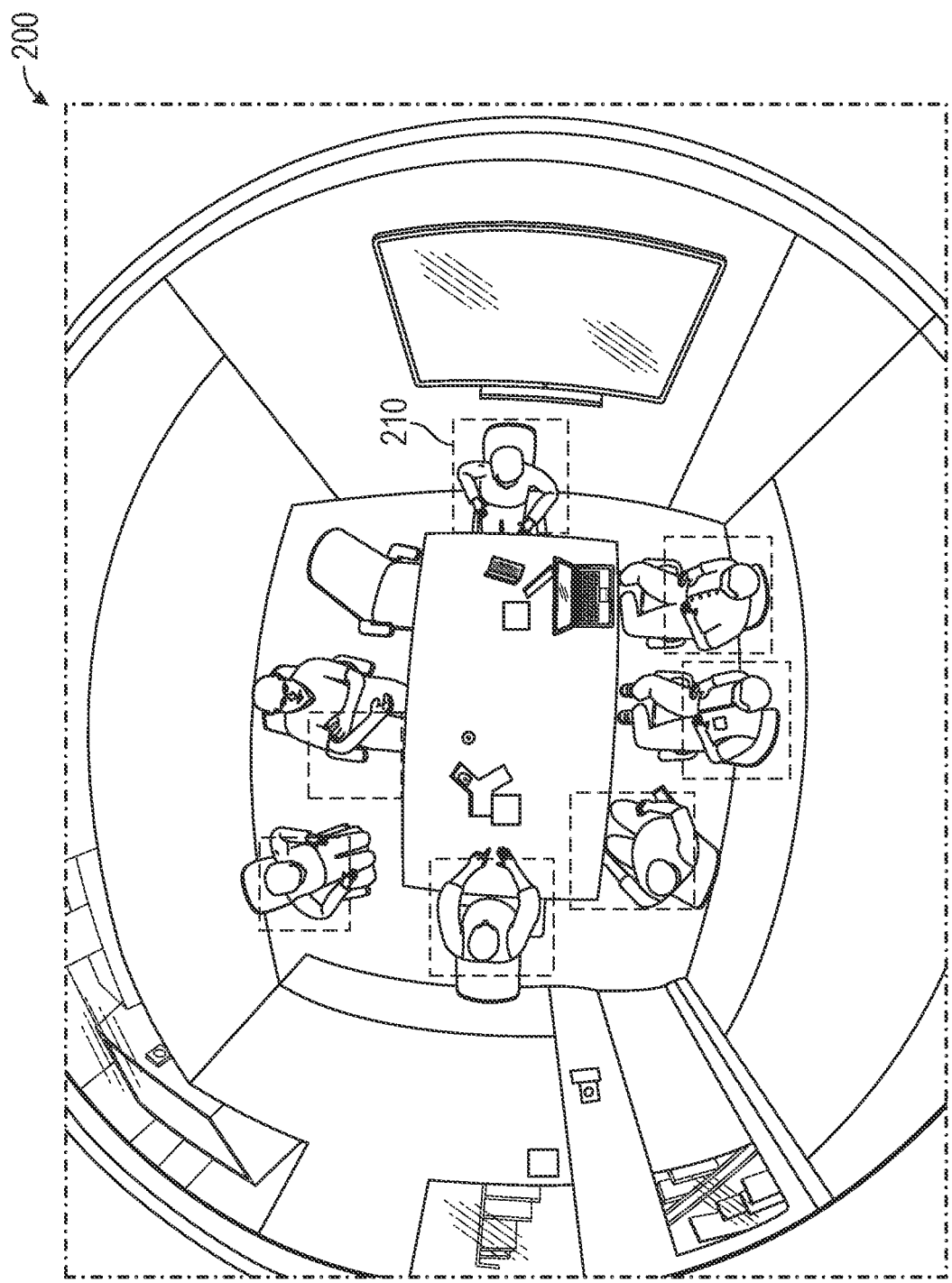
FIG. 2 is an example of an image captured by an overhead camera in accordance with various embodiments.

The second pre-processing engine runs the MOG model for background and foreground (BG/FG) classification or the generation of a BG/FG map. Modeling the background and foreground avoids learning people sitting in room as background. This can be achieved with a selective learning of the background, with masks around people such that they are not learned as background. The output of the pre-processing block 110 produces an image 200 (FIG. 2) in which different regions are identified as regions-of-interest 210 that may or may not include a target object (e.g., a human or vehicle). For example, squares or other shapes of different sizes can be added by the pre-processing block 110 to the captured image to identify regions that may contain an object to be counted and/or tracked. In some embodiments, the output of the pre-processing block 110 is provided to HOG classifiers 120 to detect presence of objects in the identified regions, such as based on a position and orientation of the regions relative to the overhead camera or sensor.

In some embodiments, the occupancy count entities go through a filter where the camera geometry (human calibrated models) is used to find modelled shape of a person in an image at that point. The overlap of shape of a person with occupancy count entity is done on the BG/FG map. If the shape criteria matches certain criteria, these occupancy count entities are added as new tracked objects.

In each and every iteration, tracked objects are matched with occupancy count entities in the tracking and counting block 140. In some embodiments, classifiers which are trained on overhead people are run in the spatial vicinity of the tracked objects. HOG classifiers that are trained to run on images of people captured by an overhead sensor or camera are discussed in more detail in connection with FIGS. 3 and 4. These HOG classifiers are used to boost confidence of the detections. There is a feedback mechanism where a tracked object with HOG classifier increases life of its corresponding occupancy entity.

In a post-processing engine (the detection block 130), some of the tracked objects (output by the classifiers 120) are not counted based on their history of motion, BG/FG pixels, and/or number of classifier detection patterns. Specifically, the post processing engine uses features from the second pre-processing engine of the pre-processing block 110 to extract at a lower image resolution, a confidence map and a motion map. The confidence map shows the confidence probability of each pixel being a person. The motion map shows the regions where there are motion features.

The post-processing engine, such as the detection block 130, computes motion regions at two different resolution of motion features, 320×240 and 80×60, to get low resolution motion blobs and high resolution motion blobs. High resolution motion blobs detect people farther away from the center, because of the increased granularity at high resolution. The output of the post-processing engine is provided to an association-tracking block 140, which associates over time uniquely identified motion regions. These motion regions or blobs are detected as potential people. These motion regions are fed back into a tracking module which tracks people. In this way, people who stop making motion are still detected without motion features. The tracking module also does a prediction using the prediction block 150 of location for the subsequent frame, which is fed back into the detection block 130. This allows the detection block to remove false positives or identify false negatives in subsequent frames of a video.

In some embodiments, the output of tracking is fed into a classifier based on HOG-SVM, which detects people based on HOG features which are pre-trained to create the SVM model. The classifier model increases the confidence of the tracked areas as people. Hence, areas with no motion can still be detected as people, and areas with motion like shadows etc., can be rejected as people. The extracted features such as motion, confidence, foreground, classifier detections are used together in the post processing engine (detection block 130) to remove false positives and false negatives, and count the people.

Figure 3:
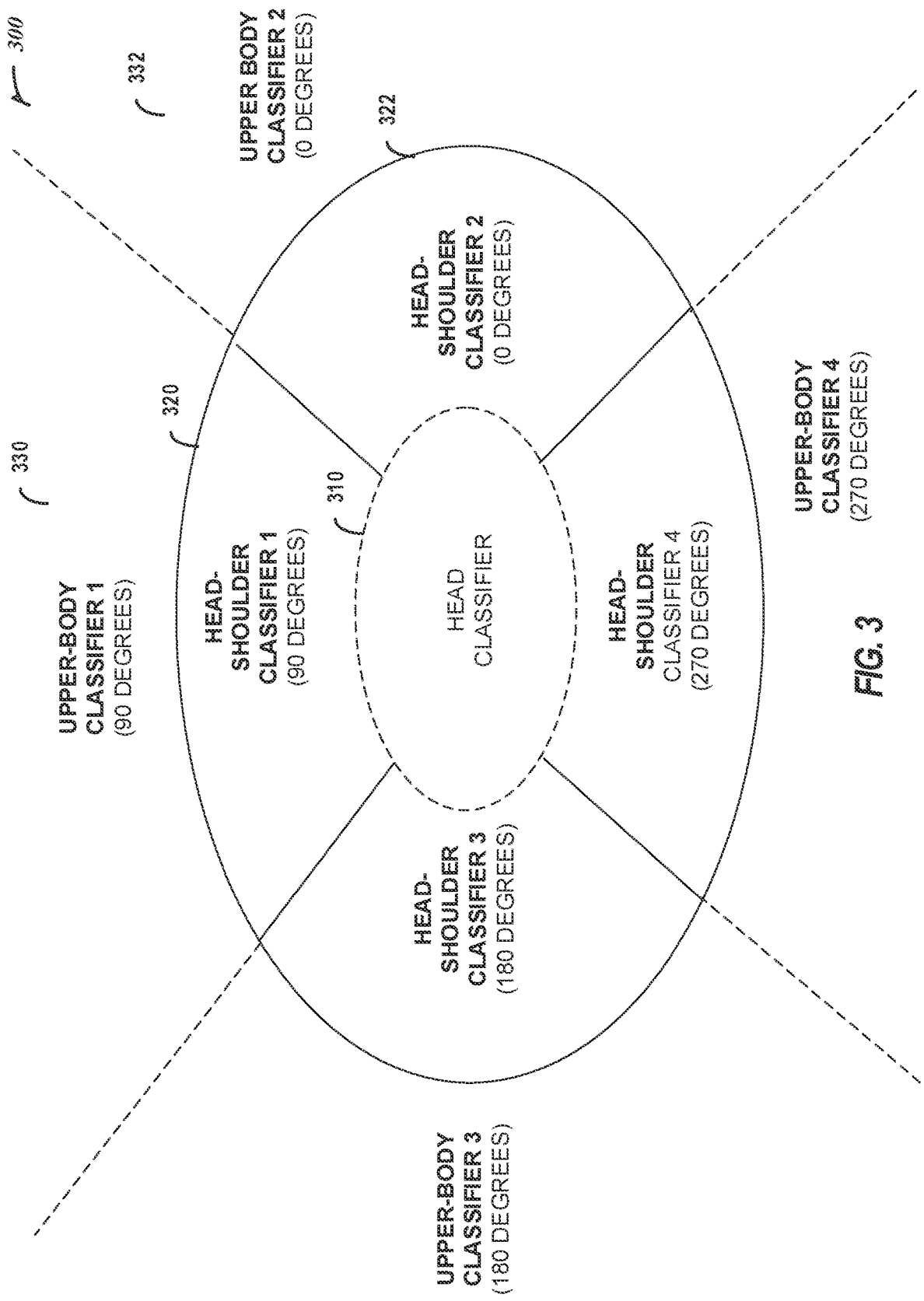
FIG. 3 is a block diagram of an region of interest (ROI) based selection of object classifiers in accordance with various embodiments.

FIG. 3 is a block diagram 300 of a region of interest (ROI) based selection of object classifiers in accordance with various embodiments. Specifically, the block diagram 300 represents the different regions the classifiers block 120 uses to detect and track objects. As an example, the classifiers block 120 using a plurality of classifiers trained on different orientations and sizes of image regions captured by an overhead sensor or camera in which different objects are depicted. Multiple classifiers may be trained one each for a unique view and size. In one example, nine classifiers are trained: one classifier type for the center of the room (e.g., a head classifier configured to detect a first feature of an object, such as a human head); four classifiers of a second type for nearby regions around the center (e.g., four head-shoulder classifiers configured to detect a second feature of an object, such as head and shoulders of a human from four different orientations and views); and four classifiers of a third type for far off regions (e.g., four upper-body classifiers configured to detect a third feature of an object, such as upper bodies of a human from four different orientations and views).

For example, each classifier may be implemented using a machine learning technique or model, such as a neural network. Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., overhead camera images depicting objects at different orientations and different distances from the overhead camera and corresponding ground truth classifications) in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying a head of an object, head-shoulders of an object, or upper body of an object).

The machine-learning algorithms utilize features for analyzing the data to generate assessments (e.g., presence or classification of a head, head-shoulders, or upper body of objects). A feature is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

The machine-learning algorithms utilize the training data to find correlations among the identified features that affect the outcome or assessment. In some example embodiments, the training data includes labeled data, which is known data for one or more identified features and one or more outcomes, such as the values of the comps.

Once the training data are collected and processed, the machine learning technique model can be built using either statistical learning or machine learning techniques. In one embodiment, regression analysis can be used to build the machine learning model. Regression analysis is a statistical process for estimating the relationships among variables. There are a number of known methods to perform regression analysis, for example: linear regression or ordinary least squares regression, among others, are "parametric" in that the regression function is defined in terms of a finite number of unknown model parameters that can be estimated from training data. As an example, for a head classifier, a regression model (e.g., Equation 1) can be defined, for example, as:

$$H \approx f(X, \beta),\quad\text{(Equation 1)}$$

where "H" denotes the known classification (features) for a set of images that depict a head of an object (e.g., ground truth classifications for a first feature, such as a head of an object), "X" denotes a vector of input variables (e.g., various images of objects taken from different orientations and distances relative to the overhead camera), and "β" denotes a vector of unknown parameters to be determined or trained for the regression model. In an embodiment, to train the model, the model is applied to a first set of input training images and produces a classification for each or a subset of the first set of input training images. The classification is compared against the ground truth classification of the input training images. The comparison is applied to a loss function to update the vector of unknown parameters of the model. Then a second set of input training images is similarly processed and used to update the parameters of the model.

Once β is estimated, the model can then compute H (e.g., classification or detection of presence of a head) for a new set of X values (e.g., feature vectors extracted from a new image received from the overhead camera).

As another example, for a head-should classifier, a regression model (e.g., Equation 2) can be defined, for example, as:

$$H \approx f(X, \beta),\quad\text{(Equation 2)}$$

where "H" denotes the known classification for a set of images that depict head-shoulders of an object (e.g., ground truth classifications for a second feature, such as a head-shoulders of an object), "X" denotes a vector of input variables (e.g., various images of objects taken from different orientations and distances relative to the overhead camera), and "β" denotes a vector of unknown parameters to be determined or trained for the regression model. In an embodiment, to train the model, the model is applied to a first set of input training images and produces a classification for each or a subset of the first set of input training images. The classification is compared against the ground truth classification of the input training images. The comparison is applied to a loss function to update the vector of unknown parameters of the model. Then a second set of input training images is similarly processed and used to update the parameters of the model.

As another example, for a head-should classifier, a regression model (e.g., Equation 3) can be defined, for example, as:

$$H \approx f(X, \beta)\quad\text{(Equation 3)}$$

where "H" denotes the known classification for a set of images that depict upper-body of an object (e.g., ground truth classifications for a third feature, such as an upper-body of an object), "X" denotes a vector of input variables (e.g., various images of objects taken from different orientations and distances relative to the overhead camera), and "β" denotes a vector of unknown parameters to be determined or trained for the regression model. In an embodiment, to train the model, the model is applied to a first set of input training images and produces a classification for each or a subset of the first set of input training images. The classification is compared against the ground truth classification of the input training images. The comparison is applied to a loss function to update the vector of unknown parameters of the model. Then a second set of input training images is similarly processed and used to update the parameters of the model.

In some cases, the vector of input variables for training the head classifier is shared and used to train the head-shoulders classifier and the upper-body classifier. In some cases, the head classifier is trained based only on a set of training images that depict an object from a single orientation and within a first threshold distance to the overhead camera. In some cases, a first head-shoulders classifier is trained based only on a set of training images that depict an object from a first orientation and within a second threshold distance to the overhead camera; a second head-shoulders classifier is trained based only on a set of training images that depict an object from a second orientation and within the second threshold distance to the overhead camera; a third head-shoulders classifier is trained based only on a set of training images that depict an object from a third orientation and within the second threshold distance to the overhead camera; and a fourth head-shoulders classifier is trained based only on a set of training images that depict an object from a fourth orientation and within the second threshold distance to the overhead camera.

Once β is estimated for Equations 1-3, the models can then compute H classification or detection of presence of a head, head-shoulders, and upper-body respectively) for a new set of X values (e.g., feature vectors extracted from a new image received from the overhead camera). The selection of which model is used to detect presence of the head, head-shoulders, or upper-body is based on the location (orientation and distance) of the object relative to the overhead camera.

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

In some embodiments, the four Head-Shoulder/Upper Body classifiers correspond to 4 rotations or orientations (0, 90, 180 and 270 degrees) relative to an overhead camera. Intermediate rotations for 45, 135, 225 and 315 degrees may also be provided with respective classifiers in some embodiments. The plurality of classifiers include classifiers of two sizes 64×64 and 56×56 for running on far off regions (e.g., region 330). In some cases, the same classifier for "Head" is used for all rotations or orientations that are within a first distance from the overhead sensor (e.g., in region 310) as the view is symmetrical in this region 310.

In some embodiments, the classifiers block 120 selects only a subset of classifiers from the plurality of classifiers based on the position of the ROI as identified by the pre-processing block 110 (the region 210 in which the square shapes are drawn). This reduces the cycles for running all classifiers, because of the way the classifiers have been trained. Also, one inherent advantage of using lesser number of classifiers is the reduced False Positives. The decision to select a particular subset based on the position of the ROI is done during the initialization phase itself and a lookup table is populated to store this information. Hence, during runtime, very little time is spent to select the classifier subset.

As an example, multiple regions can be defined and associated with different subsets of classifiers. For example, a first region 310 which is orientation invariant and represents a view that is within a first distance from the overhead sensor is defined. This first region 310 is associated with a first classifier type (e.g., a head classifier). This head classifier is trained to detect a first feature of objects, such as heads of humans, as seen by the overhead sensor in the first region 310.

A second region 320 which is at a first orientation (e.g., 90 degrees) relative to the overhead sensor and represents a view that is within a second distance from the overhead sensor is defined. The second distance may be a range that has a second distance (e.g., the range can start at the end of the first region 310 and at the beginning of a third region 330). The second distance may be greater than the first distance. This second region 320 is associated with a first classifier of a second classifier type (e.g., a head-shoulder classifier). This head-shoulder classifier is trained to detect a second feature of objects, such as head and shoulders of humans, as seen by the overhead sensor in the second region 320.

A third region 322 which is at a second orientation (e.g., 0 degrees) relative to the overhead sensor and represents a view that is within the second distance from the overhead sensor is defined. The second distance may be a range that has a second distance (e.g., the range can start at the end of the first region 310 and at the beginning of a fifth region 332). The third region 322 may be larger or smaller than the second region 320. This third region 322 is associated with a second classifier of the second classifier type (e.g., a head-shoulder classifier). This head-shoulder classifier is trained to detect the second feature of objects, such as head and shoulders of humans, as seen by the overhead sensor in the fifth region 322.

A fourth region 330 which is at the first orientation (e.g., 90 degrees) relative to the overhead sensor and represents a view that is within a third distance from the overhead sensor is defined. The third distance may be a range that has a third distance (e.g., the range can start at the end of the second region 320 and goes to infinity). The third distance may be greater than the second distance. This fourth region 330 is associated with a first classifier of a third classifier type (e.g., an upper-body classifier). This upper-body classifier is trained to detect a third feature of objects, such as upper-body of humans, as seen by the overhead sensor in the fourth region 330.

A fifth region 332 which is at the second orientation (e.g., 0 degrees) relative to the overhead sensor and represents a view that is within the third distance from the overhead sensor is defined. The third distance may be a range that has a second distance (e.g., the range can start at the end of the third region 322 and goes to infinity). The fifth region 332 may be larger or smaller than the fourth region 330. This fifth region 332 is associated with a second classifier of the second classifier type (e.g., a upper-body classifier). This upper-body classifier is trained to detect the third feature of objects, such as upper-body humans, as seen by the overhead sensor in the fifth region 332.

The first region 310 may be adjacent to the second and third regions 320 and 322. The second region 320 may be adjacent to the third region 322 and to the fourth region 330. The fourth region 330 may be adjacent to the fifth region 332 and to the second region 320. The fifth region 332 may be adjacent to the third region 322 and to the fourth region 330.

In some embodiments, in response to receiving an indication from the pre-processing block 110 of a potential object in the second region 320, the classifiers block 120 selects, based on the pre-stored associations, a first head-shoulder classifier associated with the second region 320. The first head-should classifier is applied to the image that depicts the potential object. The first head-shoulder classifier indicates whether the head and shoulders is present (e.g., provides a classification of the potential object as including the head-shoulder). If the first head-shoulder classifier indicates the detection of the head-shoulder of the potential object, then the classifiers block 120 indicates that the potential object is a human. As the potential object moves from the second region 320 to the third region 322, the classifiers block 120 selects, based on the pre-stored associations, a second head shoulder classifier associated with the third region 322 to track and detect the object. The second head-should classifier is applied to the image that depicts the potential object. The second head-shoulder classifier indicates whether the head and shoulders is still present (e.g., provides a classification of the potential object as including the head-shoulder). If the second head-shoulder classifier indicates the detection of the head-shoulder of the potential object, then the classifiers block 120 indicates that the potential object is a human and continues to detect and track the potential object. As the potential object moves from the third region 322 to the fifth region 332, the classifiers block 120 selects, based on the pre-stored associations, an upper-body classifier associated with the fifth region 332 to track and detect the object. The upper-body classifier is applied to the image that depicts the potential object. The upper-body classifier indicates whether upper body is present (e.g., provides a classification of the potential object as including the upper body of a human). If the upper-body classifier indicates the detection of the upper body of the potential object, then the classifiers block 120 indicates that the potential object is a human and continues to detect and track the potential object.

In some embodiments, the classifiers block 120 chooses between the feature type used by the selected classifier. For example, classifiers can be built using HOG only, Local Binary Pattern (LBP) only and HOG-LBP features. The classifiers block 120 chooses the feature type to use for the selected classifier in a particular region.

In some embodiments, the "Stride" which is the number of pixels between consecutive windows in "Sliding Window" detection can also be changed based on the position of the ROI. For example, the Stride for second region 320 closer to sensor (where objects are bigger) can be larger than the Stride for the third region 330 towards the extreme end of the room. Specifically, the stride is the distance between consecutive windows in pixels. As an example, if stride is 8, then the classifiers block 120 processes the first window at (0,0), then next window at (0,8), and the next window at (0,16), and so forth. A larger stride reduces the number of windows that the classifiers block 120 processes thereby reducing the processor cycles. However, too large of a stride may result in the classifiers block 120 miss detecting some objects. In one example, as the person moves away from the sensor, the person's image becomes smaller and smaller, so reducing the stride for these regions provides a better detection. As such, when the ROI is at a first distance less than a threshold away from the sensor the stride is set to a first value and when the ROI is at a second distance greater than the threshold away from the sensor the stride is set to a second value. The first value of the stride for the ROI at the first distance (e.g., closer to the sensor) may be larger than the second value of the stride for the ROI at the second distance (e.g., further away from the sensor).

In one approach, the classifier detections are be used to assign a "Confidence" metric to the tracked objects. In this case, the classifier detections are not treated as independent detections rather, the classifier is used to detect around the already tracked object. If detection is found around the tracked object then the confidence value for this object can be increased. This confidence metric can be used for multiple purposes during tracking and counting.

For example, the detection block 130 may receive an indication that an object is present in a certain region or in an image. The detection block 130 may assign a confidence metric indicating the likelihood that the object is present in the certain region based on various image processing functions performed by the pre-processing blocks. The detection block 130 may communicate with the classifiers block 120 to further refine (adjust up or down) the confidence metric. Specifically, after or before computing the confidence metric for a certain region, the detection block 130 may provide the image the depicts the object to the classifiers block 120. The classifiers block 120 may select a subset of classifiers to apply to the image based on the orientation and distance of the object in the image relative to the camera. The selected classifiers are applied to the image and provide a classification (indication of whether a head, head-shoulders, or upper-body is present) for the image as including an object with certain features. In response to the selected classifiers providing the classification that the object includes certain features, then the confidence metric associated with the object detected in the image, as computed by the detection block 130, is increased. In response to the selected classifiers providing the classification that the object does not include certain features (e.g., a head is not detected in the object that is the region 310, then the confidence metric associated with the object detected in the image, as computed by the detection block 130, is decreased.

In some embodiments, when the confidence metric exceeds a threshold (e.g., is greater than 60%) for one frame or image, or for a set of consecutive frames or images, the detection block 130 may adjust a count value that represents the number of objects in an area. In some embodiments, when the confidence metric exceeds a threshold (e.g., is greater than 60%) for one frame or image, or for a set of consecutive frames or images, the detection block 130 may continue tracking the object in subsequent images that depict the object. When the confidence metric is less than the threshold for one frame or image, or for a set of consecutive frames or images, the detection block 130 may discontinue tracking the object in subsequent images that depict the object which avoids wasting system resources and improves the efficiency of the computing device.

In some embodiments, an additional padding parameter (boundary box around the object) can also be adjusted based on the position of the ROI. Namely, padding pixels (the boundary around the tracked object) can be chosen based on the position and history of the tracked object. Increasing the padding results in additional scanning windows for the tracked object. For example, if the object is initially detected in the first region 310, the boundary box around the object can be set to a first size (e.g., the padding parameter can be set to a first amount). As the object moves to the region 330, the boundary box around the object can be reduced to a second size (e.g., the padding parameter can be reduced to a second amount from the first amount). As a result, the detection rate of the object is decreased when the object is further away from the camera and is in the region 330.

In some cases, the padding parameter can be increased in response to the confidence metric associated with the object exceeding a threshold. For example, if the object is initially associated with a first confidence metric, the boundary box around the object can be set to a first size (e.g., the padding parameter can be set to a first amount). As the confidence metric decrease, the boundary box around the object can be reduced to a second size (e.g., the padding parameter can be reduced to a second amount from the first amount). As a result, the detection rate of the object is decreased when the confidence metric indicating likelihood of presence of the object is decreased below a certain threshold.

For example, the detection rate can be adapted for a particular object based on its activity. For example, if the tracked object is moving fast then the padding is increased so that a larger area is covered for detection. For regions where the detection rate is less (such as, a corner of a big room, low contrast areas, etc.), the padding is decreased. Specifically, the object detection system 100 may analyze movement of the object across a certain number of frames. If the object detection system 100 determines that the position of the object changed from one frame to another by more than a certain threshold, the boundary box around the object can be increased in size (e.g., the padding parameter can be increased). If the object detection system 100 determines that the position of the object changed from one frame to another by less than the certain threshold, the boundary box around the object can be decreased in size (e.g., the padding parameter can be decreased).

Figure 4:
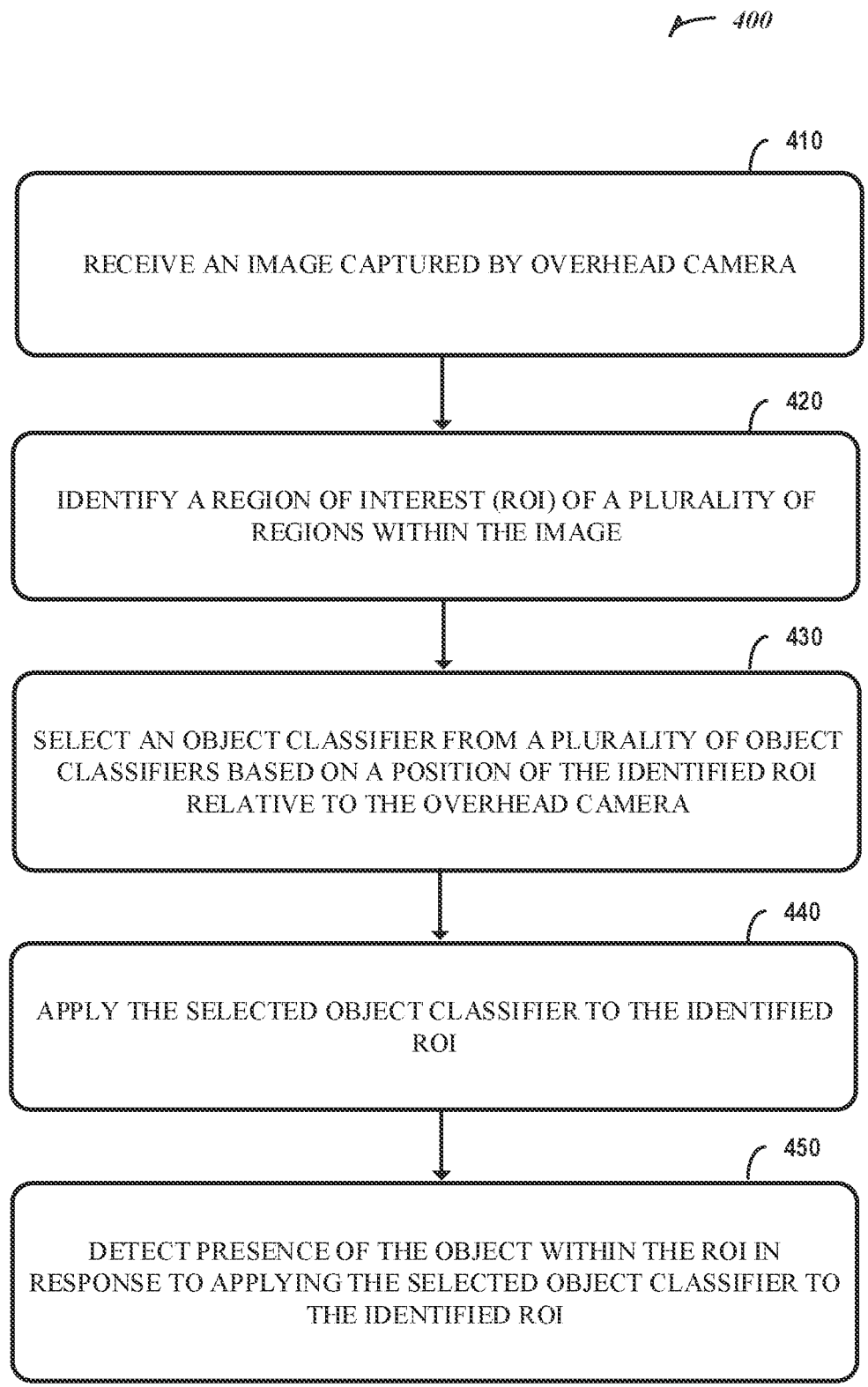
FIG. 4 is a flow diagram depicting example process for detecting an object in an image captured by an overhead camera in accordance with various embodiments.

FIG. 4 is a flow diagram depicting example process 400 for detecting an object in an image captured by an overhead camera in accordance with various embodiments. The operations of the process 400 may be performed in parallel or in a different sequence, or may be entirely omitted. In some embodiments, some or all of the operations of the process 400 may be embodied on a computer-readable medium and executed by one or more processors.

At operation 410, the object detection system 100 receives an image captured by overhead camera. For example, the pre-processing block 110 receives an image from an overhead sensor, that may include a fisheye lens.

At operation 420, the object detection system 100 identifies a region of interest (ROI) of a plurality of regions within the image. The pre-processing block 110 uses features of the image to select and mark regions 210 for detecting objects.

At operation 430, the object detection system 100 selects an object classifier from a plurality of object classifiers based on a position of the identified ROI relative to the overhead camera. For example, the classifiers block 120 selects the classifier that is associated with the ROI, such as the head-should classifier 1 if the ROI corresponds to the second region 320.

At operation 440, the object detection system 100 applies the selected object classifier to the identified ROI. The head-should classifier 1 is applied to the ROT to detect presence of the object.

At operation 450, the object detection system 100 detects presence of the object within the ROI in response to applying the selected object classifier to the identified ROI. For example, the detection block 130 uses the output of the classifiers block 120 (and optionally information from previous frames and/or future frames) to track and count the objects.

Figure 5:
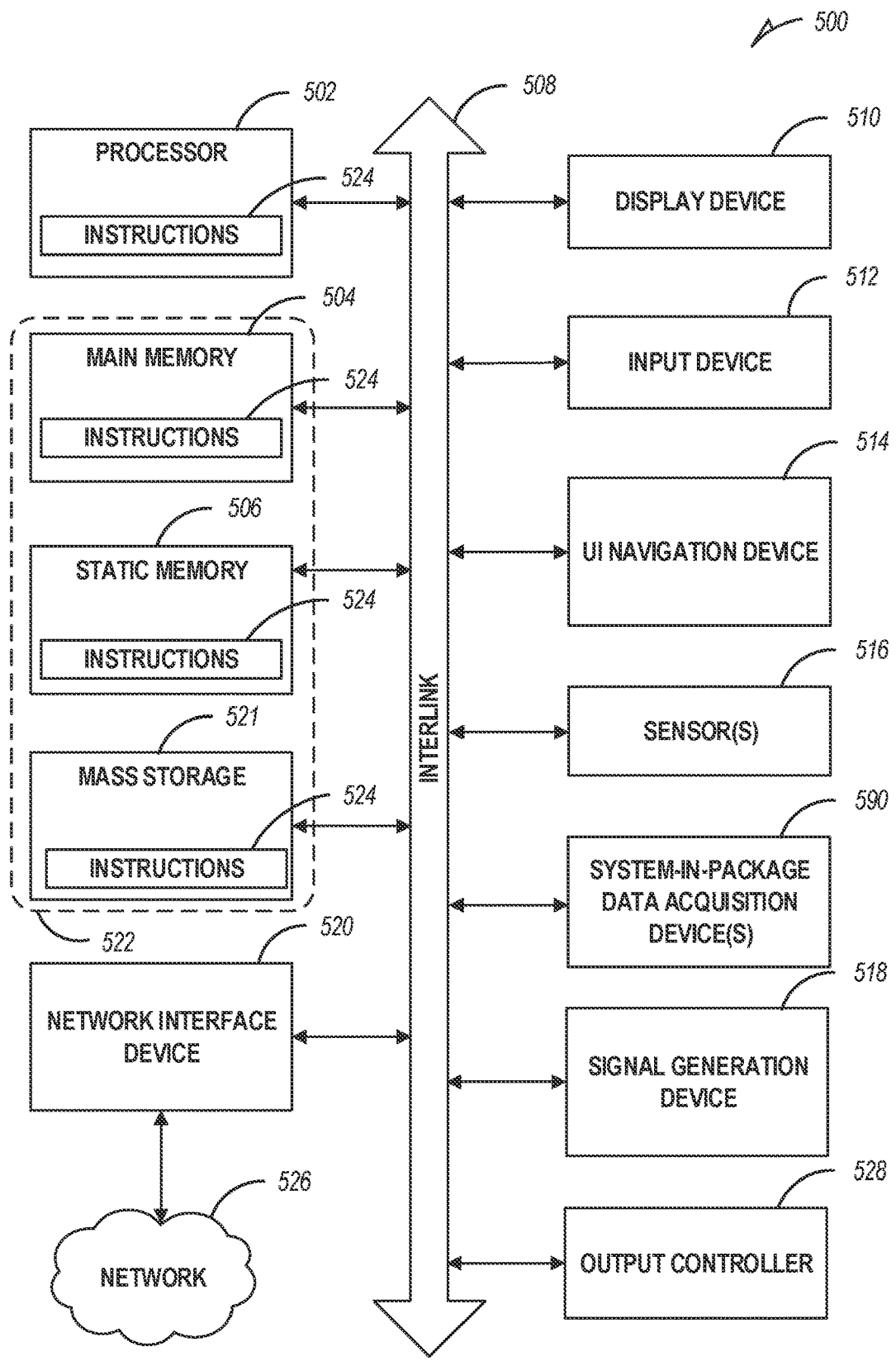
FIG. 5 is a block diagram illustrating an example of a machine upon which one or more embodiments may be implemented.

FIG. 5 is a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a set-top box (STB), a personal digital assistant (PDA), a mobile telephone, a web appliance, an IoT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 500 may include a hardware processor 502 (e.g., a central processing unit (CPU), a graphics processing unit (GPU), a hardware processor core, or any combination thereof, such as a memory controller, etc.), a main memory 504, and a static memory 506, some or all of which may communicate with each other via an interlink (e.g., bus) 508. The machine 500 may further include a display device 510, an alphanumeric input device 512 (e.g., a keyboard), and a user interface (1.11) navigation device 514 (e.g., a mouse). In an example, the display device 510, alphanumeric input device 512, and UI navigation device 514 may be a touchscreen display. The machine 500 may additionally include a storage device 522 (e.g., drive unit); a signal generation device 518 (e.g., a speaker); a network interface device 520; one or more sensors 516, such as a Global Positioning System (GPS) sensor, wing sensors, mechanical device sensors, temperature sensors, ICP sensors, bridge sensors, audio sensors, industrial sensors, a compass, an accelerometer, or other sensors; and one or more system-in-package data acquisition devices 590. The machine 500 may include an output controller 528, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 522 may include a machine-readable medium on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 521 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 524.

The term "machine-readable medium" may include any transitory or non-transitory medium that is capable of storing, encoding, or carrying transitory or non-transitory instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EEPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data that are stored on the storage device 521 can be accessed by the main memory 504 for use by the hardware processor 502. The main memory 504 (e.g., DRAM) is typically fast, but volatile, and thus a different type of storage from the storage device 521 (e.g., an SSD), which is suitable for long-term storage, including while in an "off" condition. The instructions 524 or data in use by a user or the machine 500 are typically loaded in the main memory 504 for use by the hardware processor 502. When the main memory 504 is full, virtual space from the storage device 521 can be allocated to supplement the main memory 504; however, because the storage device 521 is typically slower than the main memory 504, and write speeds are typically at least twice as slow as read speeds, use of virtual memory can greatly reduce user experience due to storage device latency (in contrast to the main memory 504, e.g., DRAM). Further, use of the storage device 521 for virtual memory can greatly reduce the usable lifespan of the storage device 521.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 520 may include one or more physical jacks Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 500, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended; that is, a system, device, article, composition, formulation, or process that includes elements in addition to those listed after such a term in a aspect are still deemed to fall within the scope of that aspect. Moreover, in the following aspects, the terms "first," "second," "third," etc. are used merely as labels, and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above detailed description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following claims are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

The invention claimed is:

1. A system for detecting an object in an image, the system comprising:
   a processor; and
   a memory for storing one or more instructions that, when executed by the processor, configure the processor to perform operations comprising:
   receiving an image captured by an overhead camera;
   identifying a region of interest (ROI) of a plurality of regions within the image;
   comparing a confidence or activity metric associated with the object to a threshold;
   adjusting a size of a boundary region comprising the ROI by a first quantity based on a result of comparing the confidence or activity metric associated with the object to the threshold;
   identifying a detection rate associated with a portion of the image;
   adjusting the size of the boundary region by a second quantity based on the detection rate associated with the portion of the image;
   selecting an object classifier from a plurality of object classifiers based on a position of the boundary region relative to the overhead camera, a first classifier of the plurality of object classifiers being configured to detect a first feature of the object, and a second classifier of the plurality of object classifiers being configured to detect a second feature of the object;
   applying the selected object classifier to the boundary region comprising the identified ROI; and
   detecting whether the object is present within the boundary region comprising the ROI in response to applying the selected object classifier to the boundary region comprising the identified ROI.

2. The system of claim 1, wherein the operations further comprise:
   associating a first region of the plurality of regions with a first subset of the object classifiers; and
   associating a second region of the plurality of regions with a second subset of the object classifiers.

3. The system of claim 2, wherein the object classifiers are configured to detect human objects, wherein the first region corresponds to a first rotation relative to the overhead camera and is within a first distance relative to the overhead camera, and wherein the first subset of the object classifiers comprises a head classifier.

4. The system of claim 3, wherein the second region corresponds to the first rotation relative to the overhead camera and is within a second distance relative to the overhead camera that is greater than the first distance, and wherein the second subset of the object classifiers comprises a first head-shoulder classifier.

5. The system of claim 4, wherein a third region of the plurality of regions corresponds to a second rotation relative to the overhead camera and is within the second distance relative to the overhead camera, and wherein the third region is associated with a second head-shoulder classifier.

6. The system of claim 4, wherein a third region of the plurality of regions corresponds to the first rotation relative to the overhead camera and is within a third distance relative to the overhead camera that is greater than the second distance, and wherein the third region is associated with a first upper-body classifier.

7. The system of claim 6, wherein a fourth region of the plurality of regions corresponds to a second rotation relative to the overhead camera and is within the third distance relative to the overhead camera, and wherein the fourth region is associated with a second upper-body classifier.

8. The system of claim 1, wherein the operations further comprise:
associating a first classifier type with a first region of the plurality of regions that is within a first distance of the overhead camera;
associating different ones of a second classifier type with each of a plurality of second regions of the plurality of regions that are within different respective rotations and at second distances relative to the overhead camera, each of the second distances being greater than the first distance; and
associating different ones of a third classifier type with each of a plurality of third regions of the plurality of regions that are within different respective rotations and at third distances relative to the overhead camera, each of the third distances being greater than the second distances.

9. The system of claim 1, wherein the operations comprise:
determining that the detection rate associated with the portion of the image is below a reference; and
reducing the size of the boundary region in response to determining that the detection rate associated with the portion of the image is below the reference.

10. The system of claim 9, wherein the portion of the image associated with the detection rate that is below the reference corresponds to a corner of a room.

11. The system of claim 9, wherein the portion of the image associated with the detection rate that is below the reference corresponds to a low contrast area.

12. The system of claim 1, wherein the object comprises a vehicle or a human, and wherein the operations further comprise:
receiving data indicating a potential presence of the object within the ROI; and
pre-processing the data to identify a plurality of features comprising at least one of motion, occlusion, a confidence map, foreground, background, or edges, wherein the ROI is identified based on the pre-processed data and one or more shape-based calibrated models.

13. The system of claim 1, wherein the operations further comprise adjusting stride based on the position of the identified ROI.

14. The system of claim 13, wherein the stride is of a first value in response to determining that the identified ROI is within a first distance of the overhead camera and is of a smaller second value in response to determining that the identified ROI is within a second distance of the overhead camera that is larger than the first distance.

15. The system of claim 1, wherein the operations further comprise assigning the confidence metric to the object, wherein the size of the boundary region is increased in response to determining that the confidence metric exceeds the threshold, wherein the boundary region comprises a first size when the object is associated with a first confidence metric, and wherein the size of the boundary region is reduced to a second size as the confidence metric decreases to a second confidence metric.

16. The system of claim 1, wherein the operations further comprise using the confidence metric to adjust a count value representing a number of people in an area.

17. The system of claim 1, wherein the operations further comprise:
adjusting the size of the boundary region based on an activity associated with the object, wherein the size of the boundary region is a first size when the activity represents movement of the object at a first rate, and wherein the size of the boundary region is a second size, smaller than the first size, when the activity represents movement of the object at a second rate that is slower than the first rate.

18. A method comprising:
receiving an image depicting an object captured by an overhead camera;
identifying a region of interest (ROI) of a plurality of regions within the image;
comparing a confidence or activity metric associated with the object to a threshold;
adjusting a size of a boundary region comprising the ROI by a first quantity based on a result of comparing the confidence or activity metric associated with the object to the threshold;
identifying a detection rate associated with a portion of the image;
adjusting the size of the boundary region by a second quantity based on the detection rate associated with the portion of the image;
selecting an object classifier from a plurality of object classifiers based on a position of the boundary region relative to the overhead camera, a first classifier of the plurality of object classifiers being configured to detect a first feature of the object, and a second classifier of the plurality of object classifiers being configured to detect a second feature of the object;
applying the selected object classifier to the boundary region comprising the identified ROI; and
detecting whether the object is present within the boundary region comprising the ROI in response to applying the selected object classifier to the boundary region comprising the identified ROI.

19. The method of claim 18, further comprising:
associating a first classifier type with a first region of the plurality of regions that is within a first distance of the overhead camera;

associating different ones of a second classifier type with each of a plurality of second regions of the plurality of regions that are within different respective rotations and at second distances relative to the overhead camera, each of the second distances being greater than the first distance; and associating different ones of a third classifier type with each of a plurality of third regions of the plurality of regions that are within different respective rotations and at third distances relative to the overhead camera, each of the third distances being greater than the second distances.

20. The method of claim 19, wherein the first classifier type comprises a head classifier, the second classifier type comprises a head-shoulder classifier, and the third classifier type comprises an upper-body classifier.

21. The method of claim 18, further comprising selecting a feature type used by the selected object classifier based on the position of the identified ROI, the feature type being selected from the group consisting of Histogram of Gradients (HOG) only, Local Binary Pattern (LBP) only and HOG-LBP.

22. An apparatus comprising:
means for receiving an image depicting an object captured by an overhead camera;
means for identifying a region of interest (ROI) of a plurality of regions within the image;
means for comparing a confidence or activity metric associated with the object to a threshold;
means for adjusting a size of a boundary region comprising the ROI by a first quantity based on a result of comparing the confidence or activity metric associated with the object to the threshold;
means for identifying a detection rate associated with a portion of the image;
means for adjusting the size of the boundary region by a second quantity based on the detection rate associated with the portion of the image;
means for selecting an object classifier from a plurality of object classifiers based on a position of the boundary region relative to the overhead camera, a first classifier of the plurality of object classifiers being configured to detect a first feature of the object, and a second classifier of the plurality of object classifiers being configured to detect a second feature of the object;
means for applying the selected object classifier to the boundary region comprising the identified ROI; and
means for detecting whether the object is present within the boundary region comprising the ROI in response to applying the selected object classifier to the boundary region comprising the identified ROI.

23. The apparatus of claim 22, further comprising:
means for associating a first classifier type with a first region of the plurality of regions that is within a first distance of the overhead camera;
means for associating different ones of a second classifier type with each of a plurality of second regions of the plurality of regions that are within different respective rotations and at second distances relative to the overhead camera, each of the second distances being greater than the first distance; and
means for associating different ones of a third classifier type with each of a plurality of third regions of the plurality of regions that are within different respective rotations and at third distances relative to the overhead camera, each of the third distances being greater than the second distances.

24. The apparatus of claim 23, wherein the first classifier type comprises a head classifier, the second classifier type comprises a head-shoulder classifier, and the third classifier type comprises an upper-body classifier.

25. The apparatus of claim 23, further comprising means for selecting a feature type used by the selected object classifier based on the position of the identified ROI, the feature type being selected from the group consisting of Histogram of Gradients (HOG) only, Local Binary Pattern (LBP) only and HOG-LBP.

* * * * *